US012084003B2

(12) United States Patent
Rapp et al.

(10) Patent No.: US 12,084,003 B2
(45) Date of Patent: Sep. 10, 2024

(54) WIPER DEVICE

(71) Applicant: Robert Bosch GmbH, Stuttgart (DE)

(72) Inventors: Harald Rapp, Buehl (DE); Adam Ugron, Budapest (HU); Andrija Terentic, Belgrad (RS); Denis Parenta, Buehl (DE); Matea Mikulic, Novi Beograd (RS); Najdan Jocic, Pancevo (RS); Nikola Dilparic, Cacak (RS); Raf Greunlinx, Zolder (BE); Sascha Geissler, Lichtenau (DE); Stijn Truyens, Tienen (BE); Tanja Bosnic, Belgrad (RS)

(73) Assignee: Robert Bosch GmbH, Stuttgart (DE)

( * ) Notice: Subject to any disclaimer, the term of this patent is extended or adjusted under 35 U.S.C. 154(b) by 328 days.

(21) Appl. No.: 17/572,031

(22) Filed: Jan. 10, 2022

(65) Prior Publication Data

US 2022/0219646 A1 Jul. 14, 2022

(30) Foreign Application Priority Data

Jan. 13, 2021 (DE) ..................... 10 2021 200 262.5

(51) Int. Cl.

| | |
|---|---|
| ***B60S 1/34*** | (2006.01) |
| ***B60S 1/04*** | (2006.01) |
| ***B60S 1/38*** | (2006.01) |
| ***B60S 1/40*** | (2006.01) |
| ***B60S 1/48*** | (2006.01) |
| ***B60S 1/52*** | (2006.01) |

(52) U.S. Cl.

CPC ........... *B60S 1/3415* (2013.01); *B60S 1/3805* (2013.01); *B60S 1/3862* (2013.01); *B60S 1/4067* (2013.01); *B60S 1/407* (2013.01); *B60S 1/4074* (2013.01); *B60S 1/4077* (2013.01); *B60S 1/487* (2013.01); *B60S 1/524* (2013.01); *B60S 1/043* (2013.01)

(58) Field of Classification Search

CPC .... B60S 1/3415; B60S 1/3862; B60S 1/4067; B60S 1/407; B60S 1/4074; B60S 1/4077; B60S 1/40; B60S 1/524; B60S 1/3805; B60S 1/487

USPC .......................................... 15/250.32, 250.04

See application file for complete search history.

(56) References Cited

U.S. PATENT DOCUMENTS 9,604,600 B2 3/2017 Izabel et al.

FOREIGN PATENT DOCUMENTS

| | | | | |
|---|---|---|---|---|
| DE | 102013103278 A1 * | 10/2014 | ............ | B60S 1/3862 |
| EP | 3138746 A1 * | 3/2017 | ............ | B60S 1/3856 |

* cited by examiner

*Primary Examiner* — Gary K. Graham

(74) *Attorney, Agent, or Firm* — Michael Best & Friedrich LLP

(57) ABSTRACT

A wiper device (10) having a wiper arm rod (14), a wiper blade adapter (20) which has a fluidic connecting element (30), a fluidic coupling element (34) for producing a fluidic connection to the fluidic connecting element (30), a fluid line (62), which is connected to the fluidic coupling element (34) and is provided for transporting wiping liquid along the wiper arm rod (14) to the fluidic coupling element (34), and a wiper arm adapter (16) which comprises a bearing unit (24) which is provided for mounting the wiper blade adapter (20) on the wiper arm adapter (16) so as to be pivotable about a wiper blade adapter pivot axis (22). The fluidic coupling element (34) is mounted movably on the wiper arm adapter (16).

15 Claims, 7 Drawing Sheets

WIPER DEVICE

BACKGROUND OF THE INVENTION

A wiper device having a wiper arm rod, having a wiper blade adapter, which has a fluidic connecting element, having a fluidic coupling element for producing a fluidic connection to the fluidic connecting element, having a fluid line, which is connected to the fluidic coupling element and is provided for transporting wiping liquid along the wiper arm rod to the fluidic coupling element, and having a wiper arm adapter, which comprises a bearing unit which is provided for mounting the wiper blade adapter on the wiper arm adapter so as to be pivotable about a wiper blade adapter pivot axis, has already been proposed.

SUMMARY OF THE INVENTION

The invention is based on a wiper device having a wiper arm rod, having a wiper blade adapter, which has a fluidic connecting element, having a fluidic coupling element for producing a fluidic connection to the fluidic connecting element, having a fluid line, which is connected to the fluidic coupling element and is provided for transporting wiping liquid along the wiper arm rod to the fluidic coupling element, and having a wiper arm adapter, which comprises a bearing unit which is provided for mounting the wiper blade adapter on the wiper arm adapter so as to be pivotable about a wiper blade adapter pivot axis.

It is proposed that the fluidic coupling element is mounted movably on the wiper arm adapter. The configuration according to the invention of the wiper device can make an advantageously simple arrangement of the fluidic coupling element on the wiper arm adapter possible. In particular, an advantageously movable wiper blade can be achieved. Furthermore, the configuration according to the invention can result in advantageously installation-friendly and low-wearing mounting of the fluidic coupling element with respect to the wiper arm adapter. The configuration according to the invention can enable the wiper device to be installed and/or removed in an advantageously rapid and simple manner.

A "wiper device" is intended to be understood as meaning preferably at least one part, preferentially a substructure assembly, of a window wiper. In principle, the wiper device may also comprise the entire window wiper, in particular, together with the wiper blade. The wiper device is preferably provided for use on a vehicle. "Provided" is intended to be understood as meaning preferably specially designed and/or specially equipped. The fact that an object is provided for a specific function is intended to preferably be understood as meaning that the object satisfies and/or carries out this specific function in at least one application state and/or operating state. The wiper device, in particular as part of the window wiper, is preferably provided for cleaning a surface, preferably a window on a vehicle. For cleaning a vehicle window, the wiper device is preferably coupled to a vehicle.

The wiper device preferably comprises a wiper arm. The wiper arm preferably comprises the wiper arm rod and the wiper arm adapter. Preferably, the wiper arm adapter has a longitudinal axis which is oriented at least substantially parallel to a longitudinal axis of the wiper arm rod. A "longitudinal axis" of an object is intended to be understood as meaning preferably an axis which is oriented parallel to a longest edge of a smallest geometrical cuboid which only just completely surrounds the object. The longitudinal axis preferably runs through a geometrical center point of the cuboid. "at least substantially parallel" is intended to be understood as meaning preferably an orientation of a direction relative to a reference direction, in particular in a plane, wherein the direction has a deviation in particular of less than 8°, advantageously less than 5° and particularly advantageously less than 2° in relation to the reference direction. The wiper arm adapter is preferably connected, in particular captively, preferably integrally, to the wiper arm rod. "integrally" is intended to be understood as meaning preferably connected at least in an integrally bonded manner, for example by a welding process, an adhesive bonding process, a molding process and/or another process appearing expedient to a person skilled in the art, and/or advantageously formed in one piece, for example by production from a casting and/or by production in a single- or multi-component injection-molding method and advantageously from an individual blank.

The wiper device preferably comprises the wiper blade. The wiper blade preferably comprises the wiper blade adapter. The wiper blade adapter, in particular the wiper blade, is preferably mounted on the wiper arm adapter so as be pivotable about the wiper blade adapter pivot axis, in particular with respect to the wiper arm. The bearing unit of the wiper arm adapter is preferably designed as a side-lock adapter. The wiper arm adapter preferably comprises a pin element. The pin element is preferably surrounded by the bearing unit. The pin element is preferably provided to form a mechanical coupling, in particular to form a pivotable mounting, of the wiper blade adapter on the wiper arm adapter. The pin element preferably defines the wiper blade adapter pivot axis. The wiper blade adapter pivot axis is particularly preferably designed as a longitudinal axis of the pin element. The wiper blade adapter pivot axis is preferably oriented at least substantially perpendicularly to the longitudinal axis of the wiper arm adapter, in particular of the wiper arm rod. The expression "at least substantially perpendicularly" is preferably intended to define an orientation of a direction relative to a reference direction, wherein the direction and the reference direction, in particular as viewed in a plane of projection, enclose an angle of 90°, and the angle has a maximum deviation of in particular less than 30°, advantageously less than 20° and particularly advantageously of less than 15°. The longitudinal axis of the pin element is preferably oriented at least substantially perpendicularly to the longitudinal axis of the wiper arm adapter. The longitudinal axis of the pin element is preferably oriented substantially parallel to a transverse axis of the wiper arm adapter. The wiper blade adapter pivot axis is preferably oriented parallel to a transverse axis of the wiper arm adapter. The wiper arm adapter preferably has a retaining bracket. The retaining bracket is preferably surrounded by the bearing unit of the wiper arm adapter. A longitudinal axis of the retaining bracket is preferably oriented at least substantially parallel to the wiper blade adapter pivot axis. The wiper blade adapter preferably has at least one mechanical connecting element for producing a connection to the wiper arm adapter, in particular to the pin element of the wiper arm adapter. The mechanical connecting element of the wiper blade adapter is preferably provided to receive the pin element of the wiper arm adapter. The at least one mechanical connecting element is preferably provided to pivotably mount the pin element. The at least one mechanical connecting element preferably has at least one recess for receiving the at least one pin element. The at least one recess preferably at least mostly forms the at least one mechanical connecting element. The wiper blade adapter pivot axis preferably runs, in particular centrally, through the at least one recess of the mechanical connecting element.

A "fluidic connecting element" is intended to be understood as meaning preferably an element which is fixedly connected to the wiper blade adapter and which can be coupled in a form-fitting and/or force-fitting manner to the fluidic coupling element to produce a fluidic connection. A "fluidic coupling element" is intended to be understood as meaning preferably an element which is connected to the fluid line in order to produce a fluidic connection and can be coupled to the fluidic connecting element in order to produce a fluidic connection. The fluid line is preferably attached to a fluid inlet of the fluidic coupling element. The fluidic coupling element is preferably coupled to the fluidic connecting element at a fluid output of the fluidic coupling element. A "fluid line" is intended to be understood as meaning preferably a duct for conducting a fluid, in particular wiping liquid. The fluid line is preferably designed as a hose. The fluid line preferably extends along the wiper arm rod. In principle, it would also be conceivable for the fluid line to be integrated in the wiper arm rod. A "fluidic connection" is intended to be understood as meaning preferably a connection in which at least two components or assemblies are connected to each other in such a manner that a fluid, in particular wiping liquid, can be exchanged between them, in particular without a loss of fluid. A fluid, in particular wiping liquid, can preferably flow between at least two fluid-conducting regions and/or fluid-conducting components via a fluidic connection, in particular the fluid line.

The fluidic coupling element is preferably mounted on the wiper arm adapter to be movable with respect to the wiper arm adapter. The fluidic connecting element is preferably in the form of a plug socket, in particular a plug-in coupling, of the wiper blade adapter. An attachment direction, in particular a plug-in direction, of the fluidic coupling element is preferably oriented perpendicularly to the longitudinal axis of the wiper blade, in particular of the wiper blade adapter, preferably at least in the connected state. The fluidic coupling element can preferably have at least one nonreturn valve, in particular two nonreturn valves. As a result, an advantageously short reaction time for providing wiping liquid can be made possible. The fluidic coupling element is preferably connectable to a pivoting of the wiper blade adapter, in particular about the wiper blade adapter pivot axis, and/or is formed releasably with/from the fluidic connecting element. The fluidic connecting element preferably forms at least one fluid inlet on the wiper blade adapter. At least one, preferably at least two, in particular fluidically separated, fluid ducts preferably run through the wiper blade adapter, in particular for operating two wiping directions of the wiper blade with wiping liquid. A "wiping liquid" is intended to be understood as meaning preferably water or a solution which may contain a cleaning additive. The wiper blade adapter, in particular each fluid duct, is preferably fluidically connected to a duct unit of a wiper strip unit of the wiper blade and/or of a wind deflector unit of the wiper blade. The wiper blade adapter preferably has at least one fluid-discharging element, in particular at least one fluid-discharging nozzle.

The fluidic coupling element is preferably mounted in a floating manner, in particular two-dimensionally. The fluidic coupling element is preferably mounted in a two-dimensionally floating manner on the retaining bracket. The at least one fluidic coupling element is preferably mounted in a floating manner on the wiper arm adapter, in particular on the retaining bracket, in a bearing plane. The bearing plane is preferably a geometrical plane which is oriented perpendicularly to the wiper blade adapter pivot axis. A movement clearance of the fluidic coupling element along the longitudinal axis of the wiper arm adapter is preferably smaller than a movement clearance of the fluidic coupling element in the bearing plane at least substantially perpendicularly to the longitudinal axis of the wiper arm adapter. The fluidic coupling element is preferably moveable in the bearing plane along the longitudinal axis of the wiper arm adapter by in particular a maximum of 5 mm, preferably a maximum of 2 mm and particularly preferably a maximum of 1 mm. The fluidic coupling element is preferably movable in the bearing plane perpendicular to the longitudinal axis of the wiper arm adapter by in particular a maximum of 20 mm, preferably a maximum of 10 mm and particularly preferably a maximum of 5 mm. The fluidic coupling element is preferably movable in the bearing plane perpendicular to the longitudinal axis of the wiper arm adapter by in particular at least 0.5 mm, preferably at least 1 mm and particularly preferably at least 2 mm.

Furthermore, it is proposed that the fluidic coupling element is mounted pivotably about the wiper blade adapter pivot axis with respect to the wiper arm adapter. This configuration can permit a particularly advantageous mounting of the fluidic coupling element in relation to the wiper arm adapter. As a result, a low-wearing operation of the wiper device can advantageously be permitted. The fluidic coupling element is preferably coupled to the wiper arm adapter. The fluidic coupling element is particularly preferably connected to the wiper arm adapter via the fluidic connecting element and the wiper blade adapter, in particular in the connected state. The fluidic coupling element is preferably not arranged on the pin element. The fluidic coupling element is preferably spaced apart from the pin element. The fluidic coupling element is preferably arranged in a region on a side of the retaining bracket that faces away from the pin element. The fluidic coupling element is preferably connected to the wiper arm adapter so as to be at least pivotable with respect to the wiper arm adapter, in particular the pin element, in particular at least by 2°, preferably at least by 5°, particularly preferably at least by 10° and very particularly preferably at least by 15°. The fluidic coupling element is preferably mounted on the wiper arm adapter in a transversely displaceable manner with respect to the wiper arm adapter. In a connected state of the fluidic coupling element and of the fluidic connecting element, the fluidic coupling element can preferably follow a pivoting movement of the wiper blade adapter with respect to the wiper arm adapter about the wiper blade adapter pivot axis by means of a movable, in particular transversely displaceable, mounting.

Furthermore, it is proposed that the wiper arm adapter has at least one bearing recess, and the fluidic coupling element has at least one bearing extension, wherein the bearing extension is guided in the at least one bearing recess. This configuration enables an advantageously simple and rapid exchange of the wiper blade. At the same time, this configuration can achieve an advantageous positioning of the fluidic coupling element during an installation and/or removal of the wiper blade on/from the wiper arm. As a result, a risk of damage to the fluidic coupling element during an installation and/or removal of the wiper blade on/from the wiper arm can advantageously be kept low. The at least one bearing recess is preferably provided to permit a movement of the fluidic coupling element during a wiper operation. The at least one bearing extension is preferably mounted in a floating manner in the at last one bearing recess. The at least one bearing extension is preferably mounted in a floating manner about the wiper blade adaptor pivot axis in the at least one bearing recess. "Mounted in a floating manner" is intended to be understood as meaning preferably a mounting in which the fluidic coupling element, in particular during a wiping operation, is movable within a region of the at least one bearing recess, wherein the fluidic coupling element is coupled to the wiper arm adapter. It is basically conceivable that the wiper blade is pivoted to and fro about the wiper blade adapter pivot axis during a wiping operation, with a maximum possible pivoting angle of the wiper blade corresponding to a maximum possible pivoting angle of the fluidic coupling element within the bearing recess. The fluidic coupling element is preferably provided to move with the wiper blade, in particular to pivot with the wiper blade adapter pivot axis, during a wiping operation. As a result, a movement of the at least one bearing extension with respect to the at least one bearing recess is coupled via a movement of the wiper blade. The at least one bearing extension is preferably hooked in the at least one bearing recess. The at least one fluidic coupling element is preferably mounted movably, in particular captively, on the wiper arm adapter, preferably by means of the at least one bearing extension which is hooked in the at least one bearing recess. The wiper arm adapter preferably has two, in particular identical, bearing recesses. The fluidic coupling element preferably has two, in particular identical, bearing extensions, or the fluidic coupling element is coupled to a second bearing extension. At least two, in particular mutually analogous, bearing recesses are preferably arranged on the at least one fluidic coupling element. The at least one fluidic coupling element preferably delimits the at least one bearing recess. The at least one fluidic coupling element preferably delimits at least two bearing recesses. The two bearing recesses are preferably formed analogously to each other. The two, in particular mutually analogous, bearing recesses are preferably arranged in alignment with each other along an axis parallel to the wiper blade adapter pivot axis. The two bearing recesses are preferably arranged on sides of the fluidic coupling element that face away from each other.

In addition, it is proposed that the at least one bearing recess has a profile which is in the form of a circular arc segment, the center point of which lies on the wiper blade adapter pivot axis. This configuration can permit an advantageous pivoting of the fluidic coupling element with respect to the wiper arm adapter. As a result, an advantageous low-friction pivoting of the fluidic coupling element can be permitted. Furthermore, an advantageously low-wearing movement of the fluidic coupling element can thereby be achieved. The circular arc segment preferably lies in the bearing plane.

Furthermore, it is proposed that the at least one bearing recess comprises an installation opening, by means of which the at least one bearing extension is insertable into the bearing recess. This configuration enables an advantageously simple installation and/or removal of the fluidic coupling element on/from the wiper arm adapter. The fluidic coupling element does not have to be loaded here per se in order to achieve a coupling and/or decoupling of the at least one bearing extension with/from the at least one bearing recess, as a result of which damage to the fluidic coupling element can advantageously be avoided. The bearing recess preferably forms an open profile by means of the installation opening. The fluidic coupling element is preferably coupled to the wiper arm adapter so as to be releasable from the wiper arm adapter. During a coupling and/or decoupling of the fluidic coupling element to/from the wiper arm adapter, the fluidic coupling element is preferably pivotable by means of the installation opening via an axis, which intersects the at least one bearing extension and which is oriented at least substantially parallel to the wiper blade adapter pivot axis, onto the profile of the at least one bearing recess, or is pivotable out of the profile of the at least one bearing recess.

Furthermore, it is proposed that the installation opening runs in a plane perpendicular to the wiper blade adapter pivot axis and at least substantially perpendicular to the profile of the bearing recess. This configuration can advantageously make it possible to avoid the fluidic coupling element unintentionally falling out of the bearing recess, in particular in a state in which the fluidic coupling element is decoupled from the fluidic connecting element. The installation opening is particularly preferably arranged in a region which intersects the profile of the bearing recess, at least substantially in the center of the profile. The installation opening preferably runs in the plane perpendicular to the wiper blade adapter pivot axis and at least substantially parallel to the longitudinal axis of the wiper arm adapter. The plane perpendicular to the wiper blade adapter pivot axis is preferably designed as the bearing plane.

In addition, it is proposed that the wiper device comprises a latching unit which is formed integrally with the fluidic coupling element and is provided to be coupled to at least one corresponding latching element of the wiper blade adapter. By means of this configuration, an advantageously simple and rapid installation and/or removal of the fluidic coupling element on/from the wiper blade adapter can be achieved. Furthermore, an advantageously single-handed installation of the fluidic coupling element can be achieved by this configuration. Furthermore, a particularly secure connection can thereby be provided between the fluidic coupling element and the fluidic connecting element. An advantageously high degree of operational reliability of the wiper device can thereby be achieved. The latching unit is preferably provided to couple the fluidic coupling element in a form-fitting and/or force-fitting manner to the fluidic connecting element. The latching unit is preferably designed as a snap-action closure. The latching unit preferably has two opposite gripping elements which, when the two gripping elements are deflected toward each other, are provided to decouple the latching unit from the at least one corresponding latching element.

Furthermore, it is proposed that the wiper device comprises a second fluidic coupling element, a second fluid line, and a heating element which is arranged in the fluid line and in the second fluid line and extends through the fluid line and the second fluid line, wherein the heating element is guided in a region of the fluidic coupling element and of the second fluidic coupling element from the fluid line into the second fluid line. By means of this configuration, an advantageously combined heating of the fluid line, the fluidic coupling element, the second fluid line and the second fluidic coupling element can be achieved with a single heating element. Furthermore, the effect which can be achieved by this configuration is that no electrical line is routed from the fluidic coupling element and/or from the fluidic coupling element to the wiper arm adapter. An advantageous movability of the fluidic coupling element and of the second fluidic coupling element with respect to the wiper arm adapter can thereby be made possible. The fluidic coupling element and the second fluidic coupling element are particularly preferably formed integrally. The latching unit is preferably formed integrally with the second fluidic coupling element. The fluidic coupling element and the second fluidic coupling element are preferably connected to each other via the latching unit. The heating element is preferably provided to convert electrical energy into thermal energy.

The heating element is preferably provided for heating the fluid line. The heating element is preferably provided for heating the second fluid line. The heating element is preferably provided for heating the fluidic coupling element. The heating element is preferably provided for heating the second fluidic coupling element. It can thereby be advantageously ensured that wiping liquid and/or components of the fluidic coupling element do not freeze. The heating element is preferably guided from the fluid line into the second fluid line in a region between the fluidic coupling element and the pin element. The heating element is preferably guided from the fluid line into the second fluid line through an opening of the fluidic coupling element and through a second opening of the second fluidic coupling element. The wiper device preferably comprises a closure element which is provided to close, in particular to seal, the opening of the fluidic coupling element. The closure element is particularly preferably also provided to close, in particular to seal, the second opening of the second fluidic coupling element. An advantageously simple installation can thereby be achieved. The closure element is preferably provided to prevent fluid from emerging from the fluidic coupling element and from the second fluidic coupling element. The closure element is preferably provided to prevent a fluid exchange between the fluidic coupling element and the second fluidic coupling element. The closure element particularly preferably receives the heating element. The heating element is preferably arranged on the closure element. The closure element is preferably designed as protection for the heating element. In principle, however, it would also be conceivable for the wiper device to comprise at least two closure elements which are formed separately from each other and which are each provided to close one of the openings.

Furthermore, it is proposed that the wiper device comprises an electrical connecting element which is mounted on the wiper arm adapter so as to be pivotable about the wiper blade adapter pivot axis. By means of this configuration, an advantageous pivoting of the electrical connecting element with respect to the wiper arm adapter can be permitted. As a result, an advantageously low-friction pivoting of the electrical connecting element can be permitted. It is thereby possible in particular to provide an advantageous secure electrical connection. The wiper device preferably comprises a fastening element which is provided to mount the electrical connecting element pivotably on the wiper arm adapter. The electrical connecting element is particularly preferably integrated in the fastening element. The electrical connecting element is preferably formed integrally with the fastening element. The fastening element is preferably pivotable together with the wiper blade about the wiper blade adapter pivot axis. The fastening element is preferably connected in a form-fitting and/or force-fitting manner to the pin element. The fastening element is particularly preferably mounted pivotably on the pin element. The fastening element preferably extends into a region within the wiper arm adapter. The fastening element is preferably in the form of a clip for producing a connection to the pin element.

In addition, it is proposed that the wiper device comprises an electrical coupling element for the electrical connection to the electrical connecting element, wherein the electrical coupling element is provided to be coupled fixedly to the wiper blade adapter by means of a latching connection. By means of this configuration, an advantageously secure and fixed connection can be achieved between the wiper blade adapter and the electrical coupling element. As a result, an advantageously secure coupling of the electrical coupling element to the electrical connecting element can be achieved. Furthermore, an advantageously defined pivoting of the electrical coupling element with respect to the wiper arm adapter can thereby be achieved. The wiper blade preferably comprises a wiper blade heating unit which is provided to heat the wiper blade. The wiper blade heating unit preferably comprises a wiper blade heating element. The wiper blade heating element is preferably flexible. The wiper blade heating element is preferably strip-shaped. The wiper blade heating element is preferably provided to convert electrical energy into thermal energy. The wiper blade heating element is preferably provided to distribute thermal energy along the wiper blade, in particular for heating fluid ducts in the wind deflector unit, the wiper blade adapter and/or end caps of the wiper blade. The wiper blade heating element is preferably also provided to heat a wiping lip of the wiper blade. The wiper blade heating element is preferably arranged on the wiper strip unit of the wiper blade and/or on the wind deflector unit of the wiper blade. The wiper blade heating unit preferably has the electrical coupling element. The electrical coupling element is preferably provided to provide an electrical connection for heating the wiper blade. The electrical coupling element is preferably provided to be mounted together with the wiper blade adapter on the wiper arm adapter. The electrical coupling element is preferably provided to be coupled to the fastening element. By means of an integral formation of the electrical connecting element and of the fastening element, tolerances for aligning the electrical coupling element with respect to the electrical connecting element can advantageously be reduced.

Furthermore, it is proposed that the wiper device comprises a retaining element which is fixedly connected to the wiper arm adapter by means of a latching connection and is provided to fix at least one electrical line, which is fixedly connected to the electrical connecting element, to the wiper arm adapter. By means of this configuration, a simple and secure fastening of the at least one electrical line can be achieved. By means of this configuration, furthermore an undefined position and/or an undefined profile of the at least one electrical line in a region around the wiper arm adapter can be advantageously avoided when the electrical connecting element, to which the at least one electrical line is connected, is pivoted. An advantageously high degree of operational reliability can thereby be ensured. The wiper device preferably comprises the at least one electrical line. The at least one electrical line is preferably provided to provide electrical energy for the wiper blade heating unit. The retaining element is particularly preferably fastened directly to the wiper arm adapter. The retaining element is preferably fastened to the wiper arm adapter from a lower side of the wiper arm adapter. In a fully mounted state, the at least one electrical line which is fixed to the retaining element is preferably arranged on a side of the wiper arm adapter that faces away from the fluidic coupling element. The retaining element is preferably arranged adjacent to the fastening element. A longitudinal axis of the retaining element is preferably oriented at least substantially parallel to the longitudinal axis of the wiper arm adapter. The retaining element is preferably plate-like, with the retaining element having a plurality of ribs. The ribs are preferably at least partially provided with at least one latching element. The retaining element is preferably attached in a form-fitting and/or force-fitting manner to the wiper arm by means of at least one latching element of the retaining element. The at least one electrical line is preferably fixed in a form-fitting manner to the retaining element by means of at least one latching element of the retaining element. The retaining element is particularly preferably designed as a liquid deflector. It can thereby be advantageously avoided that wiping liquid passes under a cover unit of the wiper device. It can thereby be advantageously avoided that liquid accumulates inside the cover unit and overspray effects thus occur.

The wiper device according to the invention is not intended to be limited here to the above-described use and embodiment. In particular, the wiper device according to the invention, in order to perform a function described herein, may have a number of individual elements, components and units which differs from the number mentioned herein. In addition, in the ranges of values indicated in this disclosure, values lying within the limits mentioned are also intended to be considered to be disclosed and usable as desired.

BRIEF DESCRIPTION OF THE DRAWINGS

Further advantages emerge from the description below of the drawings. The drawings illustrate an exemplary embodiment of the invention. The drawing, the description and the claims contain numerous features in combination. A person skilled in the art will expediently also consider the features individually and combine them to form meaningful further combinations.

In the drawings.

DETAILED DESCRIPTION

Figure 1:
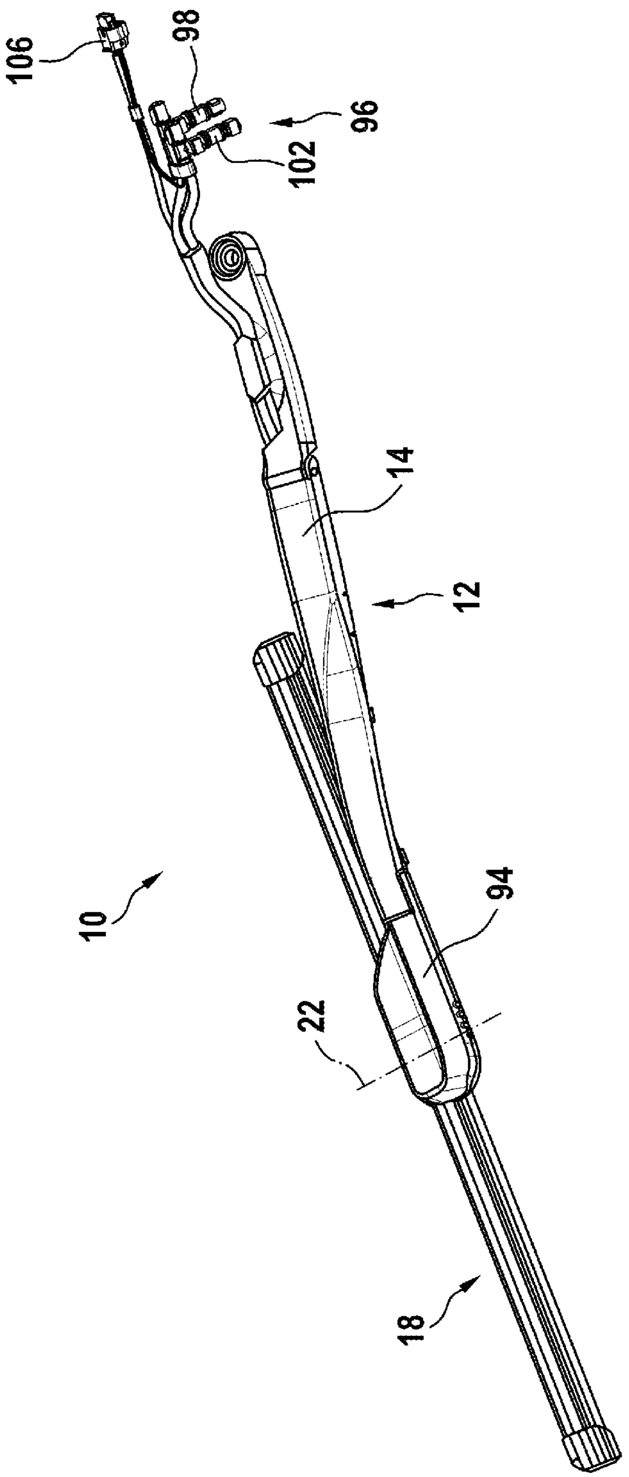
FIG. 1 shows a wiper device according to the invention in a schematic illustration.
Figure 2:
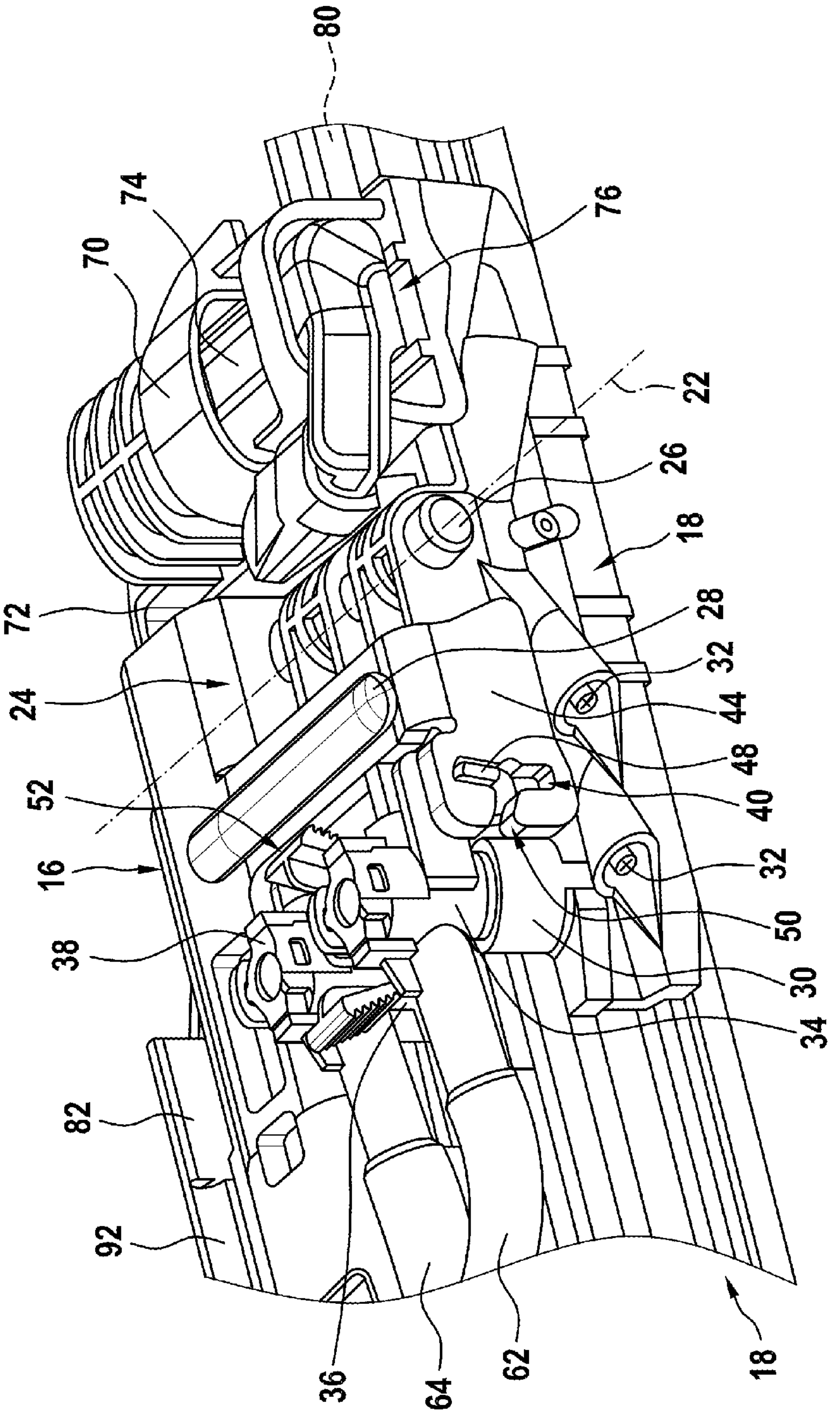
FIG. 2 shows a perspective detailed view of the wiper device according to the invention in a schematic illustration.
Figure 3:
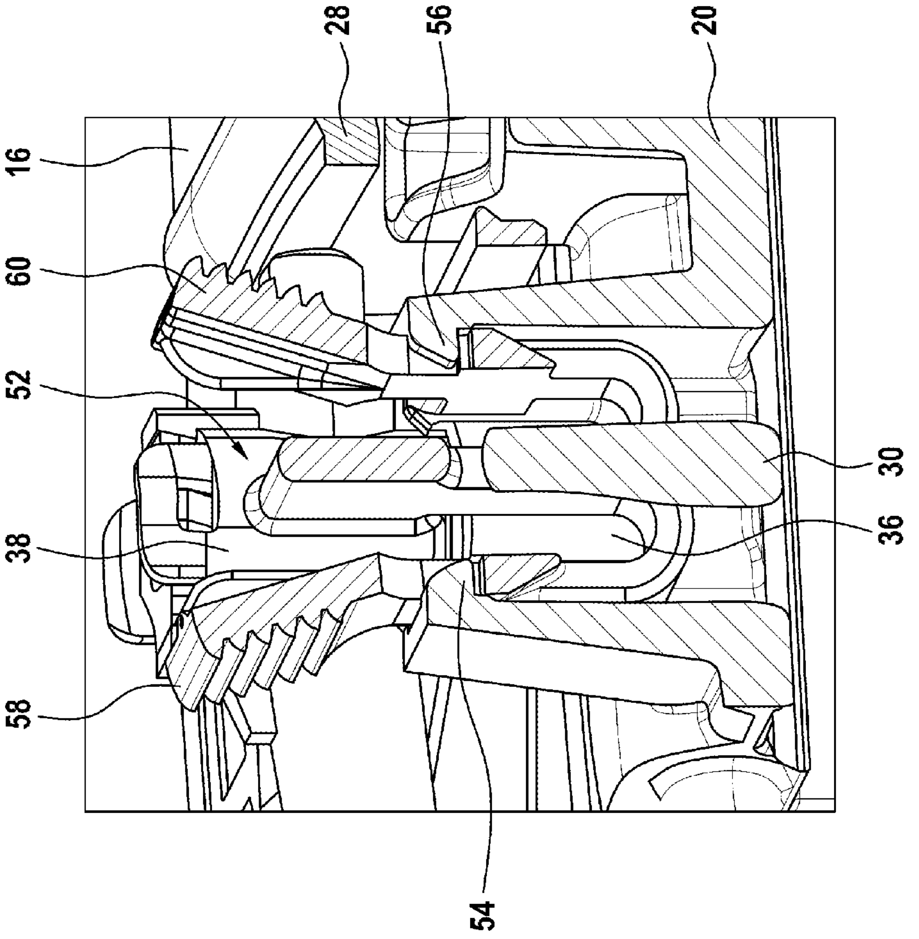
FIG. 3 shows a latching unit of the wiper device according to the invention in a schematic sectional illustration.
Figure 4:
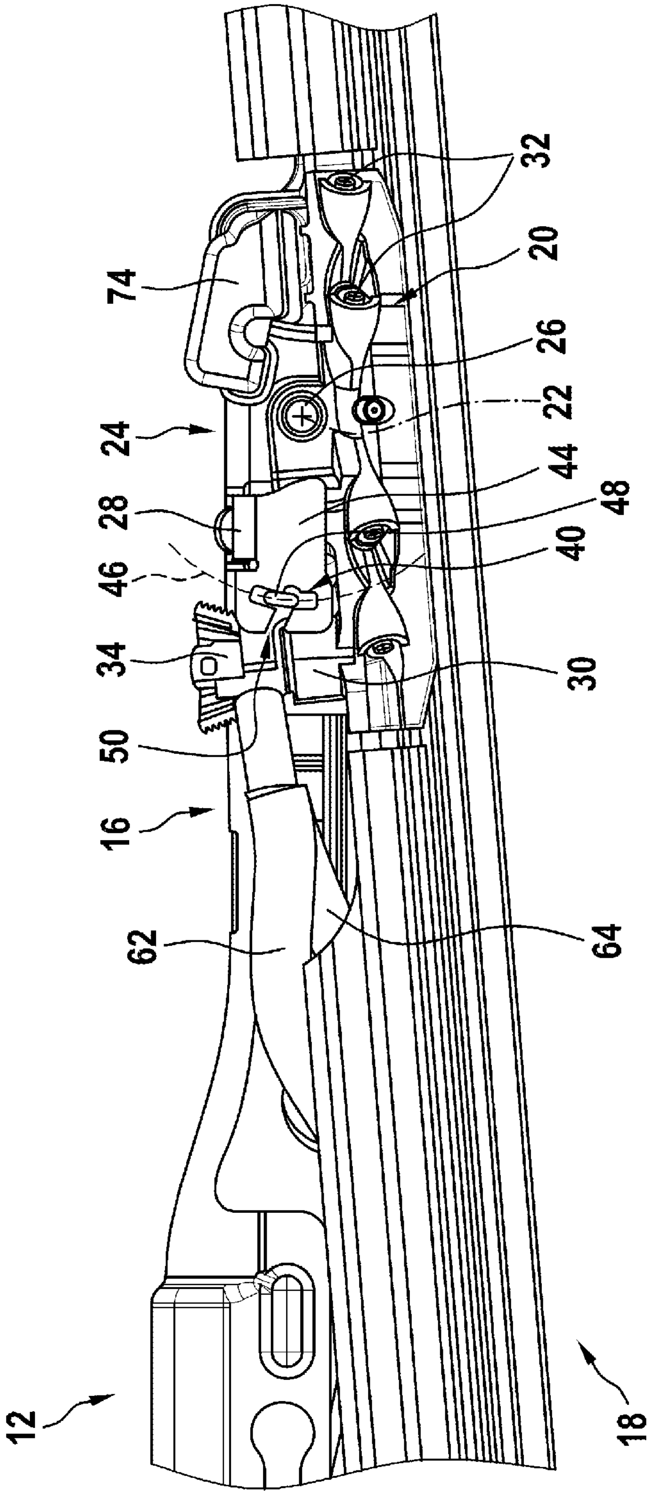
FIG. 4 shows a side view of a wiper arm adapter and of a wiper blade adapter of the wiper device according to the invention in a schematic illustration.
Figure 5:
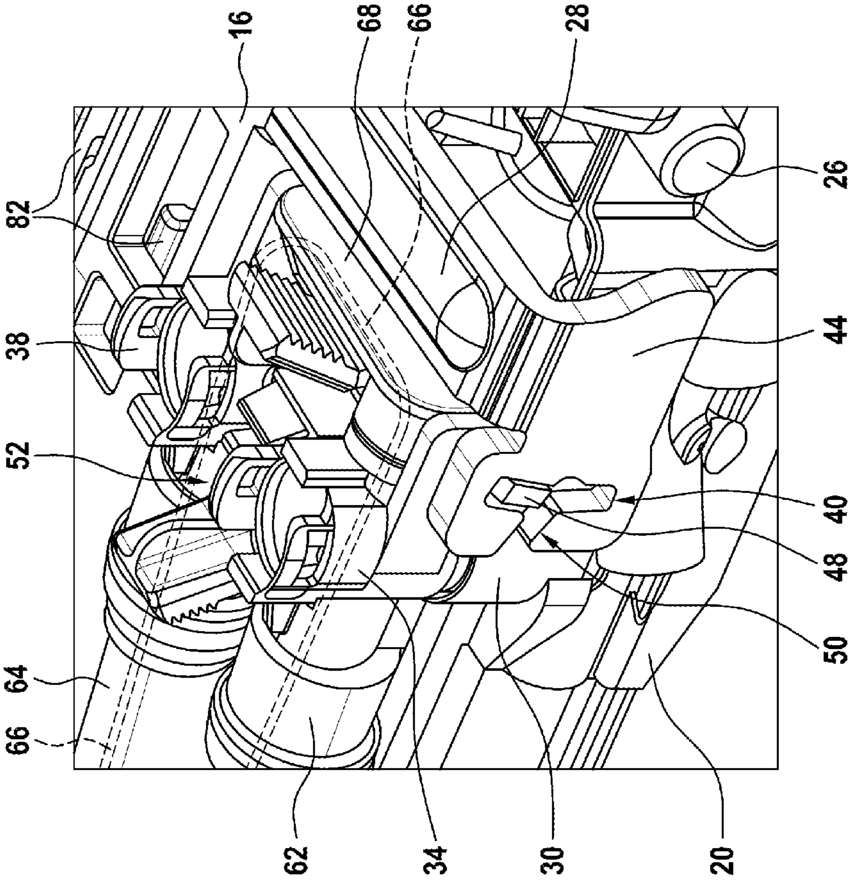
FIG. 5 shows a perspective detailed view of a fluidic coupling element and of a closure element of the wiper device according to the invention in a schematic illustration.
Figure 6:
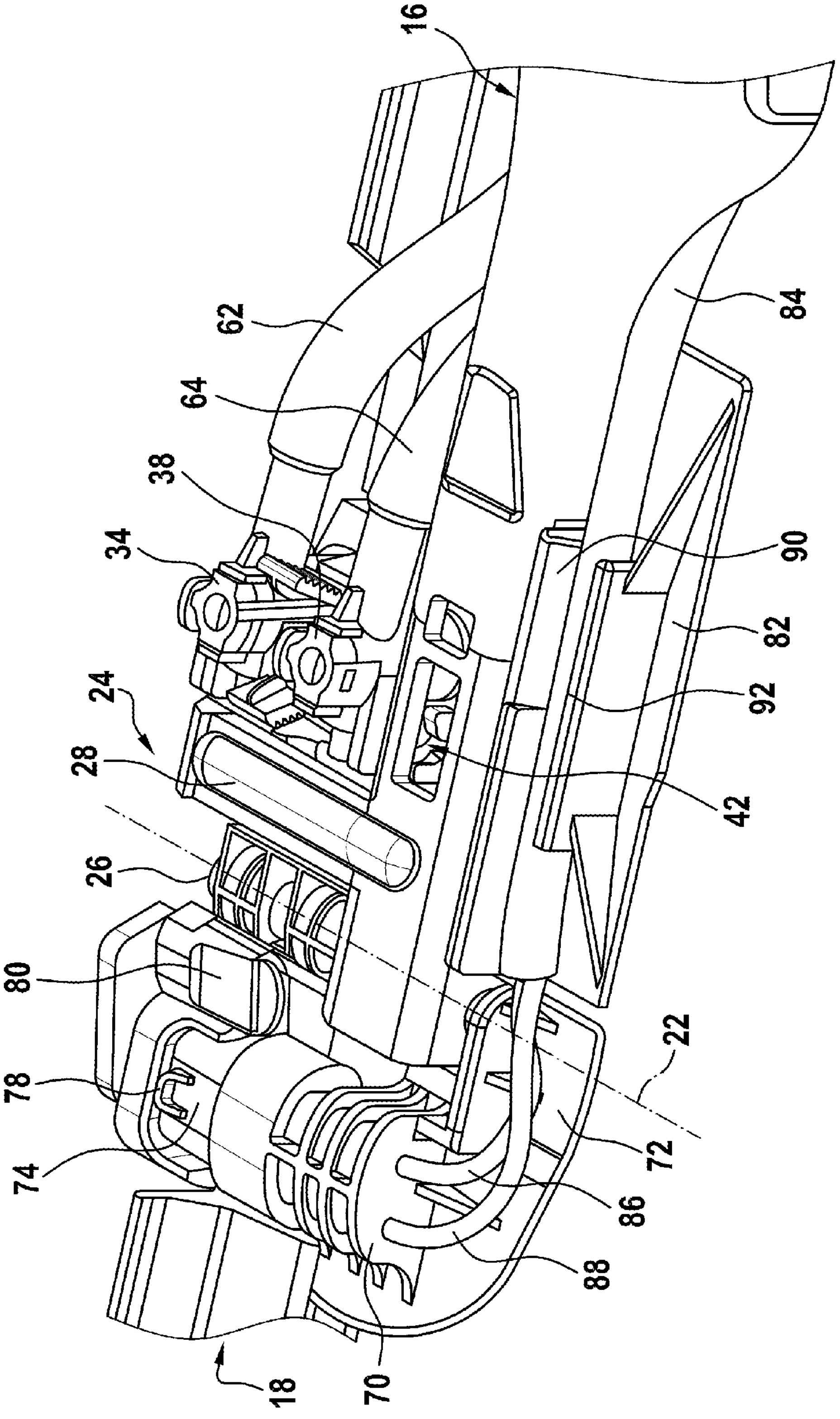
FIG. 6 shows a perspective detailed view of the wiper blade adapter and of the wiper arm adapter in a schematic illustration.
Figure 7:
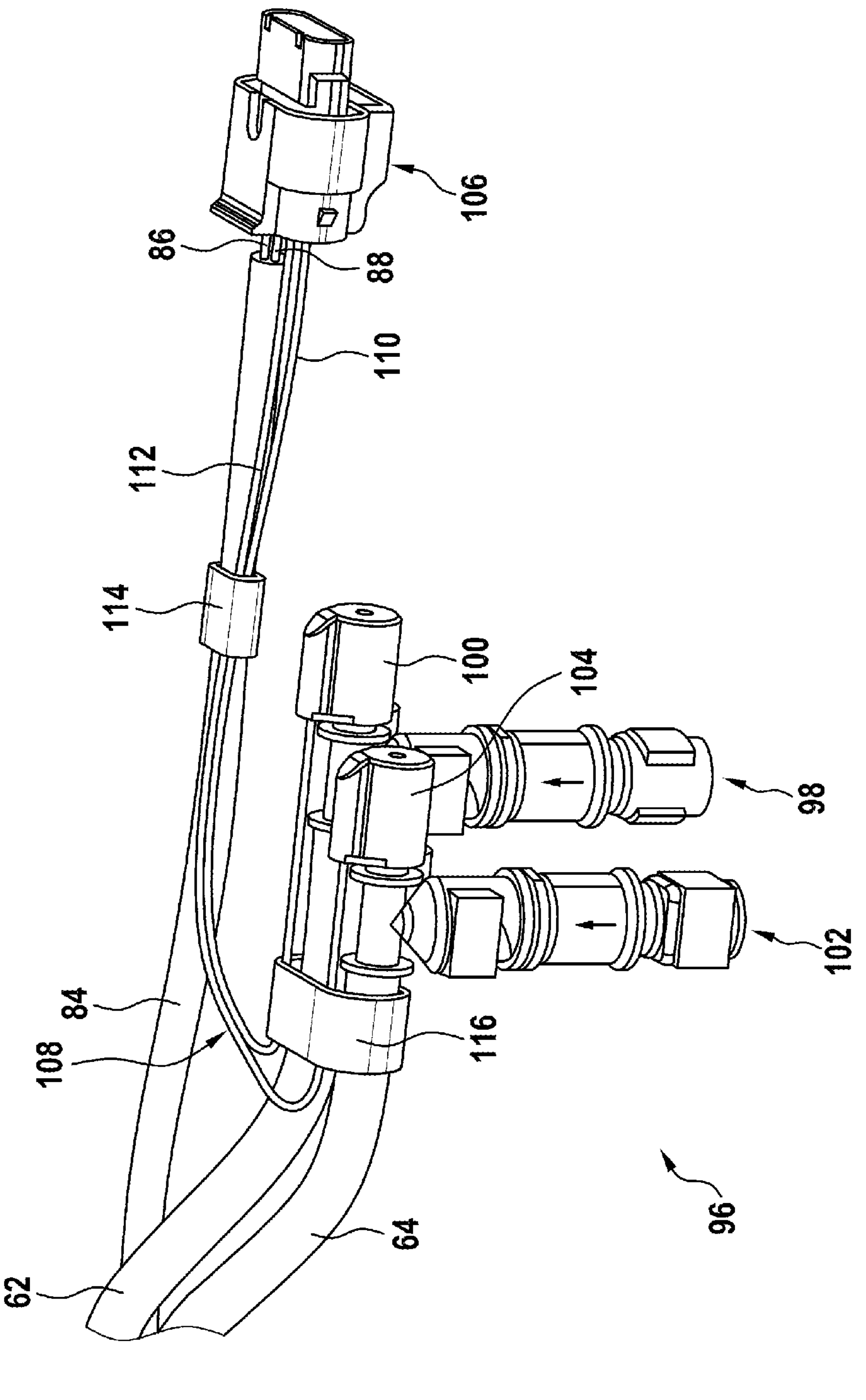
FIG. 7 shows a detailed view of a vehicle-side end of fluid lines and electrical lines of the wiper device according to the invention.

FIGS. 1 to 7 show a wiper device 10. The wiper device 10 is provided for use on a vehicle. The wiper device 10, in particular as part of a window wiper, is provided for cleaning a surface, preferably a window on a vehicle. In order to clean a vehicle window, the wiper device 10 is coupled to a vehicle.

The wiper device 10 comprises a wiper arm 12. The wiper device 10 comprises a wiper arm rod 14. The wiper device 10 comprises a wiper arm adapter 16. The wiper arm adapter 16 has a longitudinal axis which is oriented at least substantially parallel to a longitudinal axis of the wiper arm rod 14. The wiper arm adapter 16 is connected captively to the wiper arm rod 14. The wiper arm 12 comprises the wiper arm rod 14. The wiper arm 12 comprises the wiper arm adapter 16.

The wiper device 10 comprises a wiper blade 18. The wiper device 10 comprises a wiper blade adapter 20. The wiper blade adapter 20, in particular the wiper blade 18, is mounted on the wiper arm adapter 16 so as to be pivotable about a wiper blade adapter pivot axis 22, in particular with respect to the wiper arm 12. The wiper blade 18 comprises the wiper blade adapter 20.

The wiper arm adapter 16 comprises a bearing unit 24 which is provided to mount the wiper blade adapter 20 on the wiper arm adapter 16 so as to be pivotable about the wiper blade adapter pivot axis 22. The bearing unit 24 of the wiper arm adapter 16 is designed as a side-lock adapter. The wiper arm adapter 16 has a pin element 26. The pin element 26 is surrounded by the bearing unit 24. The pin element 26 is provided for a mechanical coupling, in particular for a pivotable mounting, of the wiper blade adapter 20 on the wiper arm adapter 16. The pin element 26 defines the wiper blade adapter pivot axis 22. The wiper blade adapter pivot axis 22 is designed as a longitudinal axis of the pin element 26. The wiper blade adapter pivot axis 22 is oriented at least substantially perpendicularly to the longitudinal axis of the wiper arm adapter 16, in particular of the wiper arm rod 14. The longitudinal axis of the pin element 26 is oriented at least substantially perpendicularly to the longitudinal axis of the wiper arm adapter 16. The longitudinal axis of the pin element 26 is oriented substantially parallel to a transverse axis of the wiper arm adapter 16. The wiper blade adapter pivot axis 22 is oriented parallel to a transverse axis of the wiper arm adapter 16. The wiper arm adapter 16 has a retaining bracket 28. The retaining bracket 28 is surrounded by the bearing unit 24 of the wiper arm adapter 16. A longitudinal axis of the retaining bracket 28 is oriented at least substantially parallel to the wiper blade adapter pivot axis 22. The wiper blade adapter 20 has at least one mechanical connecting element, not illustrated specifically, for a connection to the wiper arm adapter 16, in particular to the pin element 26. The mechanical connecting element of the wiper blade adapter 20 is provided to receive the pin element 26 of the wiper arm adapter 16. The at least one mechanical connecting element is provided to pivotably mount the pin element 26. The at least one mechanical connecting element has at least one recess for receiving the pin element 26. The at least one recess at least largely forms the at least one mechanical connecting element. The wiper blade adapter pivot axis 22 runs, in particular centrally, through the at least one recess of the mechanical connecting element.

The wiper blade adapter 20 has a fluidic connecting element 30. The fluidic connecting element 30 is designed as a plug socket, in particular a plug-in coupling, of the wiper blade adapter 20. The fluidic connecting element 30 forms at least one fluid inlet on the wiper blade adapter 20. At least two, in particular fluidically separated, fluid ducts run through the wiper blade adapter 20, in particular for operating two wiping directions of the wiper blade 18 with wiping liquid. The wiper blade adapter 20, in particular each fluid duct of the wiper blade adapter 20, is fluidically connected to a duct unit, not illustrated specifically, of a wiper strip unit of the wiper blade 18 and/or of a wind deflector unit of the wiper blade 18. The wiper blade adapter 20 has a plurality of fluid-discharging elements 32 which are each designed as a fluid-discharging nozzle.

The wiper device 10 comprises a fluidic coupling element 34 to produce a fluidic connection to the fluidic connecting element 30. An attachment direction, in particular a plug-in direction, of the fluidic coupling element 34 is oriented perpendicularly to the longitudinal axis of the wiper blade 18, in particular of the wiper blade adapter 20, preferably at least in the connected state. The fluidic coupling element 34 is coupled to the wiper arm adapter 16. The fluidic coupling element 34 is mounted movably on the wiper arm adapter

16. The fluidic coupling element 34 is mounted on the wiper arm adapter 16 movably with respect to the wiper arm adapter 16. The fluidic coupling element 34 is connected to the wiper arm adapter 16 via the fluidic connecting element 30 and the wiper blade adapter 20. The fluidic coupling element 34 is not arranged on the pin element 26. The fluidic coupling element 34 is arranged spaced apart from the pin element 26. The fluidic coupling element 34 is arranged in a region on a side of the retaining bracket 28 that faces away from the pin element 26. The fluidic coupling element 34 is designed to be connectable to a pivoting of the wiper blade adapter 20, in particular about the wiper blade adapter pivot axis 22, and/or to be releasable to/from the fluidic connecting element 30.

The fluidic coupling element 34 is mounted in a floating manner, in particular two-dimensionally. The fluidic coupling element 34 is mounted on the retaining bracket 28 in a two-dimensionally floating manner. The fluidic coupling element 34 is mounted on the wiper arm adapter 16, in particular on the retaining bracket 28, in a floating manner in a bearing plane. The bearing plane is a geometrical plane which is oriented perpendicularly to the wiper blade adapter pivot axis 22. A movement clearance of the fluidic coupling element 34 along the longitudinal axis of the wiper arm adapter 16 is smaller than a movement clearance of the fluidic coupling element 34 in the bearing plane at least substantially perpendicularly to the longitudinal axis of the wiper arm adapter 16. The fluidic coupling element 34 is movable in the bearing plane along the longitudinal axis of the wiper arm adapter 16 by in particular a maximum of 5 mm, preferably a maximum of 2 mm and particularly preferably a maximum of 1 mm. The fluidic coupling element 34 is movable in the bearing plane perpendicularly to the longitudinal axis of the wiper arm adapter 16 by in particular a maximum of 20 mm, preferably a maximum of 10 mm and particularly preferably a maximum of 5 mm. The fluidic coupling element 34 is movable in the bearing plane perpendicularly to the longitudinal axis of the wiper arm adapter 16 by in particular at least 0.5 mm, preferably at least 1 mm and particularly preferably at least 2 mm.

The wiper blade adapter 20 has a second fluidic connecting element 36. The second fluidic connecting element 36 is substantially identical in its configuration and operation to the fluidic connecting element 30. The wiper device 10 comprises a second fluidic coupling element 38 to produce a fluidic connection to the second fluidic connecting element 36. The second fluidic coupling element 38 is substantially identical in its configuration and operation to the fluidic coupling element 34.

The fluidic coupling element 34 is mounted so as to be pivotable about the wiper blade adapter pivot axis 22 with respect to the wiper arm adapter 16. The second fluidic coupling element 38 is mounted so as to be pivotable about the wiper blade adapter pivot axis 22 with respect to the wiper arm adapter 16. The fluidic coupling element 34 and the second fluidic coupling element 38 are provided to move with the wiper blade 18 during a wiping operation, in particular to pivot with respect to the wiper blade adapter pivot axis 22. The fluidic coupling element 34 is connected to the wiper arm adapter 16 so as to be at least pivotable with respect to the wiper arm adapter 16, in particular the pin element 26, in particular at least by 2°, preferably at least by 5°, particularly preferably at least by 10° and very particularly preferably at least by 15°. The fluidic coupling element 34 is mounted on the wiper arm adapter 16 in a transversely displaceable manner with respect to the wiper arm adapter 16. In a connected state of the fluidic coupling element 34 and of the fluidic connecting element 30, the fluidic coupling element 34 can follow a pivoting movement of the wiper blade adapter 20 with respect to the wiper arm adapter 16 about the wiper blade adapter pivot axis 22 by means of a movable, in particular transversely displaceable, mounting.

In the present case, the wiper arm adapter 16 has two bearing recesses 40, 42. The two bearing recesses 40, 42 are formed analogously with respect to each other. The two bearing recesses 40, 42 are identical. The wiper arm adapter 16 has a bearing recess 40. The bearing recess 40 is arranged on the retaining bracket 28. The bearing recess 40 is arranged on a wing element 44 of the retaining bracket 28, said wing element extending at least substantially parallel to the bearing plane. The wiper arm adapter 16 has a second bearing recess 42. The bearing recesses 40, 42 are provided to permit a movement of the fluidic coupling element 34 and of the second fluidic coupling element 38 during a wiping operation. The fluidic coupling element 34 and the second fluidic coupling element 38 are arranged between the two bearing recesses 40, 42. The fluidic coupling element 34 and the second fluidic coupling element 38 delimit the two bearing recesses 40, 42. The two bearing recesses 40, 42 are arranged in alignment with each other along an axis parallel to the wiper blade adapter pivot axis 22. The two bearing recesses 40, 42 are arranged on sides of the fluidic coupling element 34 facing away from each other.

The bearing recess 40 has a profile 46. The fluidic coupling element 34 can move along the profile 46. The profile 46 is in the form of a circular arc segment. The circular arc segment lies in the bearing plane. A center point of the circular arc segment lies on the wiper blade adapter pivot axis 22. The second bearing recess 42 has the same profile 46 which, however, is not illustrated for reasons of clarity.

The fluidic coupling element 34 has a bearing extension 48. The bearing extension 48 is guided in the bearing recess 40. The bearing extension 48 is mounted in a floating manner in the bearing recess 40. The bearing extension 48 is mounted in a floating manner about the wiper blade adapter pivot axis 22 in the bearing recess 40. The bearing extension 48 is hooked in the bearing recess 40. The fluidic coupling element 34 is mounted movably on the wiper arm adapter 16, preferably by means of the bearing extension 48 which is hooked, in particular captively, in the bearing recess 40.

The second fluidic coupling element 38 has a second bearing extension, not illustrated specifically. The second bearing extension is guided in the second bearing recess 42. The second bearing extension is mounted in a floating manner in the second bearing recess 42. The second bearing extension is mounted in the second bearing recess 42 in a floating manner about the wiper blade adapter pivot axis 22. The second bearing extension is hooked in the second bearing recess 42. The second fluidic coupling element 38 is mounted movably on the wiper arm adapter 16, preferably by means of the second bearing extension which is hooked, in particular captively, in the second bearing recess 42.

In principle, in an alternative configuration, it would also be conceivable for the wiper arm adapter 16 to have the bearing extensions 48 and for the fluidic coupling elements 34, 38 to have the bearing recesses 40, 42.

The bearing recess 40 comprises an installation opening 50 by means of which the bearing extension 48 is insertable into the bearing recess 40. By means of the installation opening 50, the bearing recess 40 forms an open profile. The fluidic coupling element 34 is coupled to the wiper arm adapter 16 so as to be releasable from the wiper arm adapter

16. The installation opening 50 runs in a plane perpendicular to the wiper blade adapter pivot axis 22 and at least substantially perpendicular to the profile 46 of the bearing recess 40. The installation opening 50 is arranged in a region which intersects the profile 46 of the bearing recess 40 at least substantially in the center of the profile 46. The installation opening 50 runs in the plane perpendicular to the wiper blade adapter pivot axis 22 and at least substantially parallel to the longitudinal axis of the wiper arm adapter 16. The plane perpendicular to the wiper blade adapter pivot axis 22 is designed as the bearing plane. During a coupling and/or decoupling of the fluidic coupling element 34 to/from the wiper arm adapter 16, the fluidic coupling element 34 is pivotable onto the profile 46 of the bearing recess 40 or is pivotable out of the profile 46 of the bearing recess 40 by means of the installation opening 50 via an axis which intersects the bearing extension 48 and which is oriented at least substantially parallel to the wiper blade adapter pivot axis 22. The second bearing recess 42 comprises a second installation opening which is formed at least substantially identically to the installation opening 50 of the bearing recess 40.

The wiper device 10 comprises a latching unit 52. The latching unit 52 is formed integrally with the fluidic coupling element 34. The latching unit 52 is formed integrally with the second fluidic coupling element 38. The fluidic coupling element 34 and the second fluidic coupling element 38 are formed integrally. The fluidic coupling element 34 and the second fluidic coupling element 38 are connected to each other via the latching unit 52. The latching unit 52 is provided to be coupled to two corresponding latching elements 54, 56 of the wiper blade adapter 20. The two corresponding latching elements 54, 56 of the wiper blade adapter 20 are arranged between the fluidic connecting element 30 and the second fluidic connecting element 36. The latching unit 52 is provided to couple the fluidic coupling element 34 in a form-fitting and/or force-fitting manner to the fluidic connecting element 30. The latching unit 52 is provided to couple the second fluidic coupling element 38 in a form-fitting and/or force-fitting manner to the second fluidic connecting element 36. The latching unit 52 is designed as a snap-action closure. The latching unit 52 has two opposite gripping elements 58, 60 which, when the two gripping elements 58, 60 are deflected toward each other, are provided to decouple the latching unit 52 from the two corresponding latching elements 54, 56.

The wiper device 10 comprises a fluid line 62. The fluid line 62 is in the form of a hose. The fluid line 62 extends along the wiper arm rod 14. The fluid line 62 is connected to the fluidic coupling element 34 and is provided to transport wiping liquid along the wiper arm rod 14 to the fluidic coupling element 34.

The wiper device 10 comprises a second fluid line 64. The second fluid line 64 is in the form of a hose. The second fluid line 64 extends along the wiper arm rod 14. The second fluid line 64 is connected to the second fluidic coupling element 38 and is provided to transport wiping liquid along the wiper arm rod 14 to the second fluidic coupling element 38.

The wiper device 10 comprises a heating element 66 which is arranged in the fluid line 62 and in the second fluid line 64 and extends through the fluid line 62 and the second fluid line 64. The heating element 66 is provided to convert electrical energy into thermal energy. The heating element 66 is guided from the fluid line 62 into the second fluid line 64 in a region of the fluidic coupling element 34 and of the second fluidic coupling element 38. The heating element 66 is provided for heating the fluid line 62. The heating element 66 is provided for heating the second fluid line 64. The heating element 66 is provided for heating the fluidic coupling element 34. The heating element 66 is provided for heating the second fluidic coupling element 38. The heating element 66 is guided from the fluid line 62 into the second fluid line 64 in a region between the fluidic coupling element 34 and the pin element 26. The heating element 66 is guided from the fluid line 62 into the second fluid line 64 through an opening of the fluidic coupling element 34 and through a second opening of the second fluidic coupling element 38.

The wiper device 10 comprises a closure element 68. The closure element 68 is provided to close, in particular to seal, the opening of the fluidic coupling element 34. The closure element 68 is also provided to close, in particular to seal, the second opening of the second fluidic coupling element 38. The closure element 68 is provided to prevent fluid from emerging from the fluidic coupling element 34 and from the second fluidic coupling element 38. The closure element 68 is provided to prevent a fluid exchange between the fluidic coupling element 34 and the second fluidic coupling element 38. The closure element 68 receives the heating element 66. In a mounted state, the heating element 66 is arranged on the closure element 68. The closure element 68 is designed as protection for the heating element 66.

The wiper device 10 comprises an electrical connecting element 70 which is mounted on the wiper arm adapter 16 so as to be pivotable about the wiper blade adapter pivot axis 22. The electrical connecting element 70 is designed as a female coupling. The wiper device 10 comprises a fastening element 72 which is provided to mount the electrical connecting element 70 pivotably on the wiper arm adapter 16. The electrical connecting element 70 is integrated in the fastening element 72. The electrical connecting element 70 is formed integrally with the fastening element 72. The fastening element 72 is pivotable together with the wiper blade 18 about the wiper blade adapter pivot axis 22. The fastening element 72 is connected in a form-fitting and/or force-fitting manner to the pin element 26. The fastening element 72 is mounted pivotably on the pin element 26. The fastening element 72 extends into a region within the wiper arm adapter 16. The fastening element 72 is in the form of a clip for producing a connection to the pin element 26.

The wiper device 10 comprises an electrical coupling element 74 for the electrical connection to the electrical connecting element 70. The electrical coupling element 74 is designed as a male coupling. The wiper blade adapter 20 has a receptacle 76 for the electrical coupling element 74. The receptacle 76 is designed in the manner of a portal. The receptacle 76 completely surrounds the electrical coupling element 74 in a sectional plane perpendicular to the wiper blade adapter pivot axis 22. The electrical coupling element 74 is provided to be coupled fixedly to the wiper blade adapter 20 by means of a latching connection. The electrical coupling element 74 has a latching element 78 which is provided to form the latching connection. In a latched state, the latching element 78 of the electrical coupling element 74 reaches behind the receptacle 76 of the wiper blade adapter 20.

The wiper blade 18 comprises a wiper blade heating unit which is provided to heat the wiper blade 18. The wiper blade heating unit has a wiper blade heating element 80. The wiper blade heating element 80 is flexible. The wiper blade heating element 80 is strip-shaped. The wiper blade heating element 80 is provided to convert electrical energy into thermal energy. The wiper blade heating element 80 is provided to distribute thermal energy along the wiper blade 18, in particular for heating fluid ducts in the wind deflector unit, the wiper blade adapter 20 and/or end caps of the wiper blade 18. The wiper blade heating element 80 is also provided to heat a wiping lip of the wiper blade 18. The wiper blade heating element 80 is arranged on the wiper strip unit of the wiper blade 18 and/or on the wind deflector unit of the wiper blade 18. The wiper blade heating unit has the electrical coupling element 74. The electrical coupling element 74 is provided to provide an electrical connection for heating the wiper blade 18. The electrical coupling element 74 is provided to be mounted together with the wiper blade adapter 20 on the wiper arm adapter 16. The electrical coupling element 74 is provided to be coupled to the fastening element 72, in particular to the electrical connecting element 70.

The wiper device 10 comprises a retaining element 82. The retaining element 82 is fixedly connected to the wiper arm adapter 16 by means of a latching connection. In the present case, the retaining element 82 is provided to fix an electrical line 84, which is connected fixedly to the electrical connecting element 70, to the wiper arm adapter 16. The electrical line 84 is provided for providing electrical energy for the wiper blade heating unit. The wiper device 10 comprises the electrical line 84. The electrical line 84 extends at least along the wiper arm rod 14. In the present case, the electrical line 84 is of two-core design. The electrical line 84 has two cores 86, 88. In principle, it would also be conceivable for the electrical line 84 to have a different number of cores. The cores 86, 88 are in each case insulated. Apart from free end regions of the electrical line 84, the electrical line 84 has a sheath which surrounds the cores 86, 88. The retaining element 82 is fastened directly to the wiper arm adapter 16. The retaining element 82 is fastened to the wiper arm adapter 16 from a lower side of the wiper arm adapter 16. In a completely mounted state, the electrical line 84 which is fixed to the retaining element 82 is arranged on a side of the wiper arm adapter 16 that faces away from the fluidic coupling element 34. The retaining element 82 is arranged adjacent to the fastening element 72. A longitudinal axis of the retaining element 82 is oriented at least substantially parallel to the longitudinal axis of the wiper arm adapter 16. The retaining element 82 is plate-like, with the retaining element 82 having a plurality of ribs which extend perpendicularly away from a base plate of the retaining element 82. The ribs are at least partially provided with at least one latching element. The retaining element 82 is attached in a form-fitting and/or force-fitting manner to the wiper arm adapter 16 by means of at least one latching element, not illustrated specifically, of the retaining element 82. The electrical line 84 is fixed in a form-fitting manner to the retaining element 82 by means of two latching elements 90, 92 of the retaining element 82. The wiper device 10 comprises a cover unit which has a cap element 94. The cap element 94 is provided to at least partially, preferably at least largely, cover the wiper blade adapter 20, in particular the wiper arm adapter 16. The cap element 94 is provided to cover at least the fluidic coupling element 34 and the second fluidic coupling element 38 in relation to an environment. The cap element 94 is provided to cover at least the fastening element 72, the electrical connecting element 70 and the electrical coupling element 74 in relation to an environment. The fastening element 72 is designed as a liquid deflector. The fastening element 72 extends as far as an outer edge of the cap element 94. The cap element 94 is provided to cover at least the retaining element 82 in relation to an environment. The retaining element 82 is designed as a liquid deflector. The retaining element 82 extends as far as an outer edge of the cap element 94. The cap element 94 is formed by a shell-like cover cap. The cover unit is connected captively to the wiper arm 12, in particular to the wiper arm adapter 16. In the present case, the pivot axis of the cap element 94 is oriented parallel to the wiper blade adapter pivot axis 22.

The fluid line 62, the second fluid line 64 and the electrical line 84 are bunched at a vehicle-side end 96 of the wiper device 10. The vehicle-side end of the fluid line 62 has an attachment unit 98 to produce a fluidic connection of the fluid line 62 to a wiping liquid container and/or to a wiping liquid pump. The attachment unit 98 is T-shaped. The attachment unit 98 can have at least one non-return valve. The attachment unit 98 has a heating element attachment 100. One end of the heating element 66 is connected to the heating element attachment 100. The vehicle-side end of the second fluid line 64 has a second attachment unit 102 to produce a fluid connection of the second fluid line 64 to a wiping liquid container and/or to a wiping liquid pump. The second attachment unit 102 is T-shaped. The second attachment unit 102 can have at least one nonreturn valve. The second attachment unit 102 has a second heating element attachment 104. A second end of the heating element 66 is connected to the second heating element attachment 104.

The wiper device 10 comprises a vehicle-side electrical coupling element 106. The vehicle-side electrical coupling element 106 is designed as a male coupling. In the present case, the vehicle-side electrical coupling element 106 comprises four poles. Two of the four poles are provided for the wiper blade heating element 80. Two further of the four poles are provided for the heating element 66. The electrical line 84 is electrically connected at its vehicle-side end to the vehicle-side electrical coupling element 106.

The wiper device 10 comprises a further electrical line 108. The further electrical line 108 is electrically connected to the vehicle-side electrical coupling element 106. The further electrical line 108 is connected to the heating element attachment 100 and to the second heating element attachment 104. The further electrical line 108 is of two-core design. The further electrical line 108 has two cores 110, 112. The two cores 110, 112 of the further electrical line 108 are in each case insulated. In contrast to the electrical line 84, the further electrical line 108 does not have a sheath which surrounds the cores 110, 112. The cores 110, 112 of the further electrical line 108 are at least partially separated from each other. One of the two cores 110 of the further electrical line 108 is connected to the heating element attachment 100. Another of the two cores 112 of the further electrical line 108 is connected to the second heating element attachment 104. The fluid line 62 and the second fluid line 64 are connected to the electrical line 84 via the further electrical line 108 at the vehicle-side end 96 of the wiper device 10.

The wiper device 10 comprises a fastening means 114 which is provided to fix the two cores 110, 112 of the further electrical line 108 to the electrical line 84. The fastening means 114 is designed as a tape which surrounds the electrical line 84 and the further electrical line 108. The fastening means 114 can be designed, for example, as a loop and hook tape or as a cable tie. The wiper device 10 comprises a further fastening means 116 which is provided to fix the two cores 110, 112 of the further electrical line 108 to the fluid line 62 and to the second fluid line 64. The further fastening means 116 is designed as a tape which surrounds the fluid line 62, the second fluid line 64 and the further electrical line 108. The further fastening means 116 can be designed, for example, as a loop and hook tape or as a cable tie. As a result, the cores 110, 112 of the further electrical line 108 can advantageously be arranged on the fluid line 62 and on the second fluid line 64. An advantageously simple and secure installation and/or removal of the wiper device 10 can thereby take place.

What is claimed is:

1. A wiper device (10) comprising:
   - a wiper arm rod (14),
   - a wiper blade adapter (20), which has a fluidic connecting element (30),
   - a fluidic coupling element (34) for producing a fluidic connection to the fluidic connecting element (30),
   - a first fluid line (62), which is connected to the fluidic coupling element (34) and is provided for transporting wiping liquid along the wiper arm rod (14) to the fluidic coupling element (34), and
   - a wiper arm adapter (16), which comprises a bearing unit (24) which is provided for mounting the wiper blade adapter (20) on the wiper arm adapter (16) so as to be pivotable about a wiper blade adapter pivot axis (22), wherein the fluidic coupling element (34) is mounted movably on the wiper arm adapter (16), wherein the fluidic coupling element (34) is mounted pivotably about the wiper blade adapter pivot axis (22) with respect to the wiper arm adapter (16), and wherein the wiper arm adapter (16) includes at least one bearing recess (40, 42) having a profile (46) which forms a circular arc segment, the circular arc segment including a center point of which lies on the wiper blade adapter pivot axis (22).

2. The wiper device (10) according to claim 1, wherein the fluidic coupling element (34) has at least one bearing extension (48), wherein the bearing extension (48) is guided in the at least one bearing recess (40, 42).

3. The wiper device (10) according to claim 2, wherein the at least one bearing recess (40, 42) comprises an installation opening (50), by means of which the at least one bearing extension (48) is insertable into the bearing recess (40, 42).

4. The wiper device (10) according to claim 3, wherein the installation opening (50) runs in a plane perpendicular to the wiper blade adapter pivot axis (22) and at least substantially perpendicular to the profile (46) of the bearing recess (40, 42).

5. The wiper device (10) according to claim 1, further comprising a latching unit (52) which is formed integrally with the fluidic coupling element (34) and is provided to be coupled to at least one corresponding latching element (54, 56) of the wiper blade adapter (20).

6. The wiper device (10) according to claim 1, further comprising a second fluidic coupling element (38), a second fluid line (64), and a heating element (66) which is arranged in the first fluid line (62) and in the second fluid line (64) and extends through the first fluid line (62) and the second fluid line (64), wherein the heating element (66) is guided in a region of the fluidic coupling element (34) and of the second fluidic coupling element (38) from the first fluid line (62) into the second fluid line (64).

7. The wiper device (10) according to claim 1, further comprising an electrical connecting element (70) which is mounted on the wiper arm adapter (16) so as to be pivotable about the wiper blade adapter pivot axis (22).

8. The wiper device (10) according to claim 7, further comprising an electrical coupling element (74) for the electrical connection to the electrical connecting element (70), wherein the electrical coupling element (74) is provided to be coupled fixedly to the wiper blade adapter (20) by means of a latching connection.

9. The wiper device (10) according to claim 8, further comprising a retaining element (82) which is fixedly connected to the wiper arm adapter (16) by means of a latching connection and is provided to fix at least one electrical line (84), which is fixedly connected to the electrical connecting element (70), to the wiper arm adapter (16).

10. The wiper device (10) according to claim 7, further comprising a retaining element (82) which is fixedly connected to the wiper arm adapter (16) by means of a latching connection and is provided to fix at least one electrical line (84), which is fixedly connected to the electrical connecting element (70), to the wiper arm adapter (16).

11. The wiper device (10) according to claim 1, wherein the wiper arm adapter (16) has at least one bearing recess (40, 42), and the fluidic coupling element (34) has at least one bearing extension (48), wherein the bearing extension (48) is guided in the at least one bearing recess (40, 42).

12. The wiper device (10) according to claim 1, wherein the at least one bearing recess (40, 42) comprises an installation opening (50), by means of which at least one bearing extension (48) is insertable into the bearing recess (40, 42).

13. A wiper device (10) comprising:
   - a wiper arm rod (14),
   - a wiper blade adapter (20), which has a fluidic connecting element (30),
   - a fluidic coupling element (34) for producing a fluidic connection to the fluidic connecting element (30),
   - a first fluid line (62), which is connected to the fluidic coupling element (34) and is provided for transporting wiping liquid along the wiper arm rod (14) to the fluidic coupling element (34),
   - a wiper arm adapter (16), which comprises a bearing unit (24) which is provided for mounting the wiper blade adapter (20) on the wiper arm adapter (16) so as to be pivotable about a wiper blade adapter pivot axis (22), wherein the fluidic coupling element (34) is mounted movably on the wiper arm adapter (16),
   - an electrical connecting element (70) which is mounted on the wiper arm adapter (16) so as to be pivotable about the wiper blade adapter pivot axis (22), and
   - an electrical coupling element (74) for the electrical connection to the electrical connecting element (70), wherein the electrical coupling element (74) is provided to be coupled fixedly to the wiper blade adapter (20) by means of a latching connection.

14. The wiper device (10) according to claim 13, further comprising a retaining element (82) which is fixedly connected to the wiper arm adapter (16) by means of a latching connection and is provided to fix at least one electrical line (84), which is fixedly connected to the electrical connecting element (70), to the wiper arm adapter (16).

15. A wiper device (10) comprising:
   - a wiper arm rod (14),
   - a wiper blade adapter (20), which has a fluidic connecting element (30),
   - a fluidic coupling element (34) for producing a fluidic connection to the fluidic connecting element (30),
   - a first fluid line (62), which is connected to the fluidic coupling element (34) and is provided for transporting wiping liquid along the wiper arm rod (14) to the fluidic coupling element (34),
   - a wiper arm adapter (16), which comprises a bearing unit (24) which is provided for mounting the wiper blade adapter (20) on the wiper arm adapter (16) so as to be pivotable about a wiper blade adapter pivot axis (22), wherein the fluidic coupling element (34) is mounted movably on the wiper arm adapter (16), an electrical connecting element (70) which is mounted on the wiper arm adapter (16) so as to be pivotable about the wiper blade adapter pivot axis (22), and a retaining element (82) which is fixedly connected to the wiper arm adapter (16) by means of a latching connection and is provided to fix at least one electrical line (84), which is fixedly connected to the electrical connecting element (70), to the wiper arm adapter (16).

* * * * *